United States Patent
Puglisi, Sr.

(10) Patent No.: US 8,573,673 B1
(45) Date of Patent: Nov. 5, 2013

(54) STAKE POCKET MOUNTING BAR FOR PORTABLE STEP

(76) Inventor: Kenneth Lee Puglisi, Sr., Finleyville, PA (US)

( * ) Notice: Subject to any disclaimer, the term of this patent is extended or adjusted under 35 U.S.C. 154(b) by 0 days.

(21) Appl. No.: 13/415,674

(22) Filed: Mar. 8, 2012

Related U.S. Application Data

(60) Provisional application No. 61/450,602, filed on Mar. 8, 2011.

(51) Int. Cl.
*B62D 25/00* (2006.01)

(52) U.S. Cl.
USPC .............. 296/62; 296/43; 182/127; 280/163

(58) Field of Classification Search
USPC ............. 296/43, 62; 182/90, 91, 92, 93, 127, 182/150, 194, 196–199, 206; 280/163
See application file for complete search history.

(56) References Cited

U.S. PATENT DOCUMENTS

| | | | | |
|---|---|---|---|---|
| 4,757,876 A * | 7/1988 | Peacock | ........................ | 182/95 |
| 4,846,487 A * | 7/1989 | Criley | ........................... | 280/166 |
| 5,205,603 A * | 4/1993 | Burdette, Jr. | .................... | 296/62 |
| 5,624,127 A * | 4/1997 | Arreola et al. | ................ | 280/163 |
| 5,803,523 A * | 9/1998 | Clark et al. | .................. | 296/26.1 |
| 5,941,342 A * | 8/1999 | Lee | ................................ | 182/95 |
| 6,003,633 A * | 12/1999 | Rolson | .......................... | 182/127 |
| 6,270,139 B1 * | 8/2001 | Simpson | ........................ | 296/62 |
| 6,371,719 B1 * | 4/2002 | Hildebrandt | .................. | 414/537 |
| 6,499,564 B2 * | 12/2002 | Puglisi | .......................... | 182/150 |
| 6,964,444 B2 * | 11/2005 | Chumley et al. | ........... | 296/26.08 |
| 7,055,838 B2 * | 6/2006 | Lambie | ......................... | 280/166 |
| 7,114,736 B2 * | 10/2006 | Stodola et al. | ............. | 280/164.1 |
| 7,261,357 B1 * | 8/2007 | Bechen | .......................... | 296/62 |
| 7,401,798 B2 * | 7/2008 | Dolan | ........................... | 280/163 |
| 7,455,307 B2 * | 11/2008 | Seely et al. | ................... | 280/163 |
| 8,091,907 B1 * | 1/2012 | Barnett | ......................... | 280/165 |
| 2007/0273123 A1 * | 11/2007 | Wilson | .......................... | 280/166 |
| 2010/0096215 A1 * | 4/2010 | McFarlane | .................... | 182/106 |

\* cited by examiner

*Primary Examiner* — Lori Lyjak
(74) *Attorney, Agent, or Firm* — Clark Hill Thorp Reed; Paul D. Bangor, Jr.

(57) ABSTRACT

A stake pocket mounting bar for removably attaching a step to a truck bed or other generally horizontal surface, comprising: an anchor member defining at least one open slot for removably receiving a looped end of a strap; a leg member having first and second ends wherein the first end is attached to the anchor member and the second end defines a plurality of teeth. The anchor member may define two open slots. The leg member may define a bend, preferably about a 90° bend between its first and second ends so that when the leg member is inserted into a stake pocket of the truck bed, the teeth will be disposed generally horizontally such that they may engage the side of the truck bed. The anchor may be made of angle iron.

5 Claims, 4 Drawing Sheets

US 8,573,673 B1

STAKE POCKET MOUNTING BAR FOR PORTABLE STEP

CROSS REFERENCE TO RELATED APPLICATIONS

The present application claims benefit and priority from U.S. provisional application Ser. No. 61/450,602 entitled "STAKE POCKET MOUNTING BAR FOR PORTABLE TRUCK STEP", filed Mar. 8, 2011, the disclosure of which is hereby incorporated by reference herein in its entirety for all purposes.

TECHNICAL FIELD OF THE INVENTION

This invention relates to portable steps and, more particularly, to portable steps and attachments devices and means for removably attaching the portable steps to a flatbed of a truck or trailer.

BACKGROUND

Field of the Disclosure

In the prior art, there have been many applications for portable steps. For example, the difficulties and inconvenience of repeatedly entering and exiting the bed of a pickup or flatbed truck has been a persistent problem. In particular, construction contractors and others who have a need for frequent or ongoing access to the truck bed have found it difficult and tiresome to continually climb in and out of the truck bed from the level of the ground or other surface that supports the tires of the truck.

It has been known in the prior art to sometimes provide concrete blocks or similar materials to form a step adjacent to the truck by which entry to and exit from the truck can be more easily achieved. It has also been known in the prior art to sometimes provide a plank or board of wood or metal to use as a ramp for entry and exit of objects, such as motorcycles, quads, etc., to and from a truck bed. However, these temporary steps and/or ramps are not always convenient to assemble due to a variety of causes, such as a lack of space or unavailability of materials. Moreover, in many applications, such steps or ramps can be unstable and create a safety hazard by contributing to potential falls or other accidents.

Accordingly, there was a need in the prior art for a portable step and devices and means for removably attaching such portable step to the bed of a pickup or flatbed truck or trailer so that the portable step could be quickly erected that could be reliably and safely used for ingress to and egress from the truck bed. Also, it was necessary for the step to be mechanically adjustable so that it could accommodate uneven terrain or various surface conditions at the places where the steps were applied.

These and other advantages of the invention will be appreciated by reference to the detailed description of the preferred embodiment(s) that follow.

BRIEF SUMMARY OF THE INVENTION

In a first aspect, the present invention comprises a stake pocket mounting bar for removably attaching a step to a truck bed or other generally horizontal surface, comprising: an anchor member defining at least one open slot for removably receiving a looped end of a strap; a leg member having first and second ends wherein the first end is attached to the anchor member and the second end defines a plurality of teeth.

In accordance with yet another aspect of the stake pocket mounting bar, the anchor may be made of angle iron.

In yet a further aspect of the stake pocket mounting bar, the anchor member may define two open slots. The leg member may define a bend, preferably about a 90° bend between its first and second ends so that when the leg member is inserted into a stake pocket of the truck bed, the teeth will be disposed generally horizontally such that they may engage the side of the truck bed. In yet another aspect of the plate cooler stave, the main body is disposed between the shell wall and a refractory lining in the furnace.

In yet an additional aspect of the stake pocket mounting bar, the leg member may define a bend, preferably about a 90° bend between its first and second ends so that when the leg member is inserted into a stake pocket of the truck bed, the teeth will be disposed generally horizontally such that they may engage the side of the truck bed.

BRIEF DESCRIPTION OF THE DRAWINGS

For the present disclosure to be easily understood and readily practiced, the present disclosure will now be described for purposes of illustration and not limitation in connection with the following figures, wherein.

DETAILED DESCRIPTION OF PREFERRED EMBODIMENT(S) OF THE INVENTION

Figure 1:
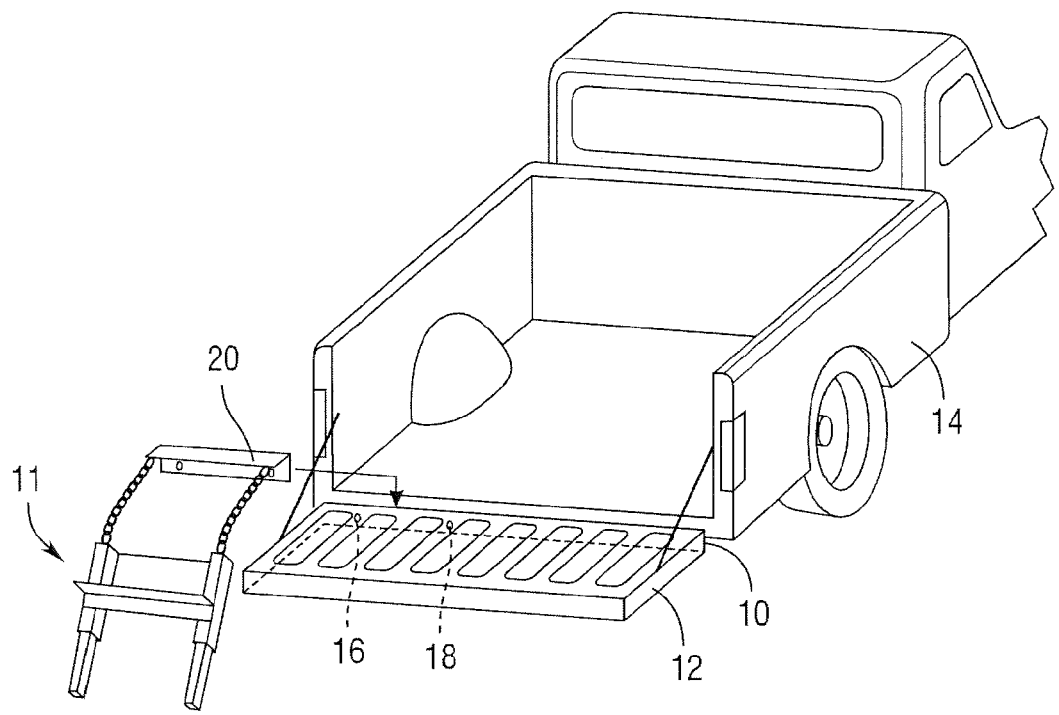
FIG. 1 is an projection of the portable step as it is applied to a pickup truck.
Figure 2:
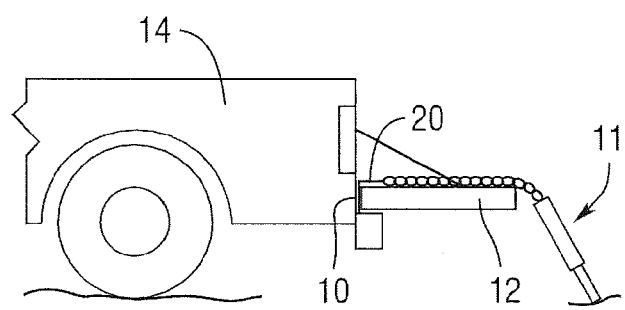
FIG. 2 is a side view of the portable step that is shown in FIG. 1.

In the following detailed description, reference is made to the accompanying examples and figures that form a part hereof, and in which is shown, by way of illustration, specific embodiments in which the inventive subject matter may be practiced. These embodiments are described in sufficient detail to enable those skilled in the art to practice them, and it is to be understood that other embodiments may be utilized and that structural or logical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents.

As shown in FIGS. 1-5 which are from U.S. Pat. No. 6,499,564, the teachings of which are incorporated by reference herein, the presently disclosed portable step 11 is connected to the inside edge 10 of the tail gate 12 on a pickup truck 14. The inside edge 10 of the tailgate 12 is provided with two holes 16 and 18 by which the portable step engages the pickup truck 14 as hereinafter more fully explained.

With particular regard to FIGS. 1-4, the adjustable step includes an anchor 20 that secures the step to the pickup truck 14. Anchor 20 is comprised of two generally rectangular strips of steel 22 and 24. Strip 22 defines a major edge 26 and minor edges 28 and 30. Strip 24 defines a major edge 32 and minor edges 34 and 36. Strips 22 and 24 are joined along a common major edge 38. Strip 22 defines a face 40 and strip 24 also defines a face 42. Strips 22 and 24 are oriented with respect to each other such that face 40 is angularly oriented with respect to face 42 along the longitudinal axis 43 of the common major edge 38. Face 40 of strip 22 cooperates with face 42 of strip 24 to define an angle "a" between faces 40 and 42. In the preferred embodiment of the presently disclosed invention, angle "a" is substantially 90 degrees although strips 22 and 24 could be angularly oriented to alternatively define angles other than 90.degree.

Face 40 of strip 24 includes pins 44 and 46 which are members for engaging tailgate 12 of truck 14. Pins 44 and 46 are cross-sectionally dimensioned to fit within the diameter of holes 16 and 18 in tailgate 12. In this way, anchor 20 engages truck 14 to secure the portable step to the truck.

The portable step further includes two rails 48 and 50 which serve as siderails of the step. Rails 48 and 50 are tubular members in which walls define respective internal passageways 52 and 54. As shown in FIGS. 1-4, passageways 52 and 54 are generally square in cross-section although other cross-sectional shapes are also within the scope of the presently disclosed invention. Rail 48 has first end 56 and second end 58. Rail 50 has first end 60 and second end 62.

In the preferred embodiment, a step 64 is connected to rails 48 and 50. Specifically, step 64 has one end 66 that is connected to rail 48 at a longitudinal position along rail 48 that is between first end 56 and second end 58. Step 64 also has another end 68 that is connected to rail 50 at a longitudinal position along rail 50 that is between first end 60 and second end 62.

A brace 70 has first and second ends 72 and 74 respectively and is also connected to rails 48 and 50. First end 72 of brace 70 is connected to rail 48 at a longitudinal position between first and second ends 56 and 58 and second end 74 of brace 70 is connected to rail 50 at a longitudinal position along rail 50 between first and second ends 60 and 62. Brace 70 cooperates with step 64 to maintain rails 48 and 50 in substantially parallel relationship with respect to each other.

The portable step of FIGS. 1-4 further includes first and second connecting members 76 and 78. Connecting members 76 and 78 are attached to anchor 20 and to rails 48 and 50 respectively to connect the rails to truck 14. In the example of the preferred embodiment, connecting members 76 and 78 are flexible members such as chains and or straps. Connecting member 76 has first and second ends 80 and 82 with first end 80 attached to anchor 20 and second end 82 attached to the first end 56 of rail 48. Connecting member 78 has first and second ends 84 and 86 with first end 84 attached to anchor 20 and second end 86 attached to the first end 60 of rail 50. While connecting members 76 and 78 are shown as chains in the example of the preferred embodiment, other flexible members such as steel cables could also be used.

Figure 3:
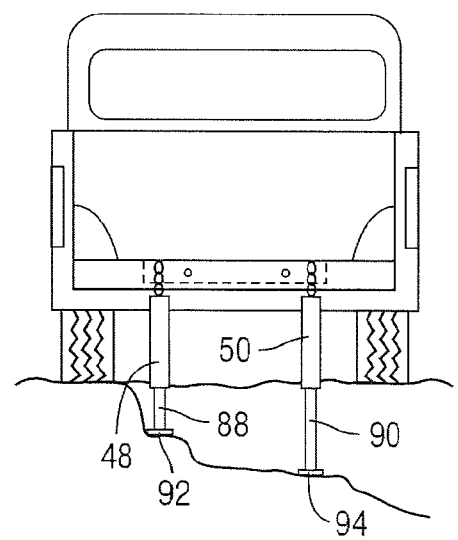
FIG. 3 is an end view of the portable step that is shown in FIGS. 1 and 2.
Figures 4, 5:
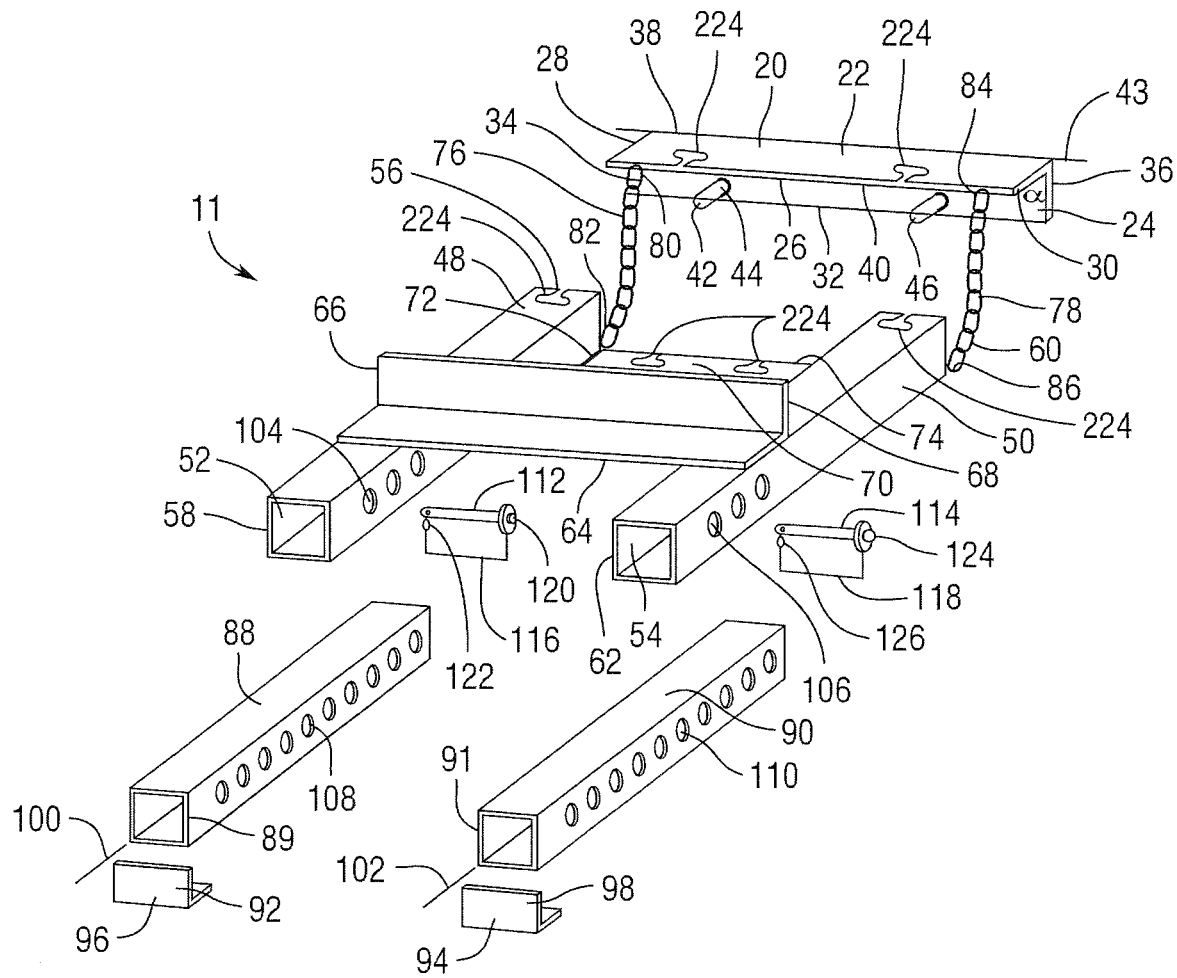
FIG. 4 is a partially exploded projection of the step that is shown in FIGS. 1, 2 and 3 with portions thereof disassembled to better disclose the details thereof.
FIG. 5 is a side view of an alternative embodiment of the portable step that is shown in FIG. 1 wherein the chains in FIG. 1 are replaced by cables.
Figure 6:
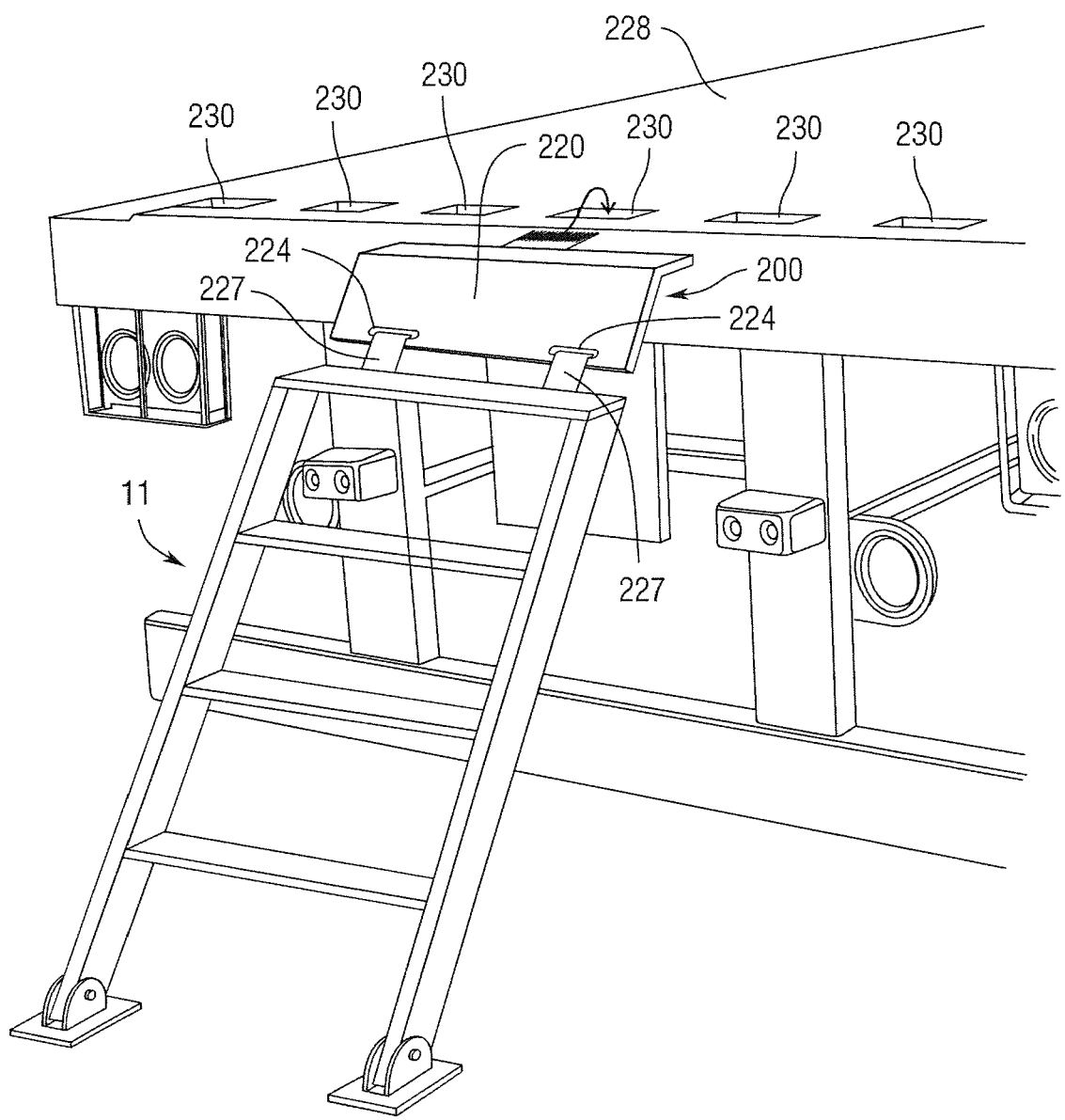
FIG. 6 is a perspective view of a portable step having a stake pocket mounting bar according to a preferred embodiment of the present invention for removable attachment to a flatbed of a truck.
Figure 7:
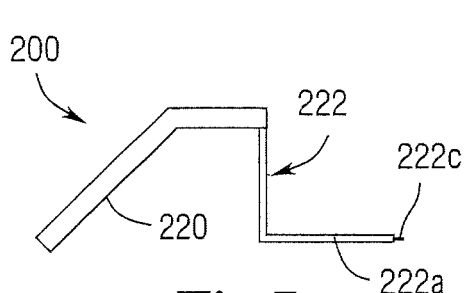
FIG. 7 is a side view of the stake pocket mounting bar of FIG. 6.
Figure 8:
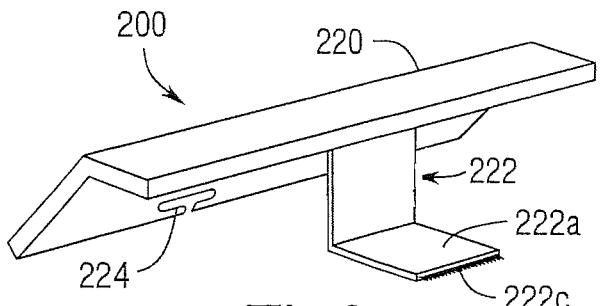
FIG. 8 is a perspective view of the stake pocket mounting bar of FIG. 6.
Figure 9:
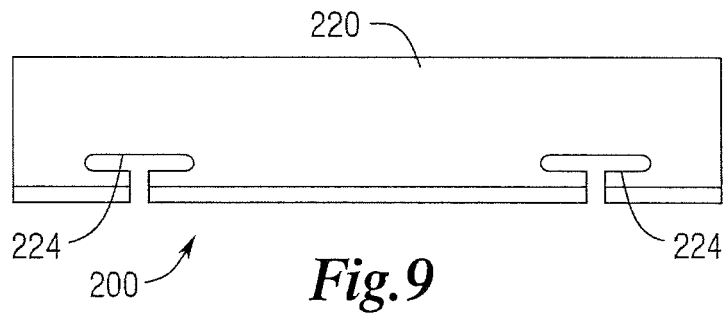
FIG. 9 is a front view of the stake pocket mounting bar of FIG. 6.
Figure 10:
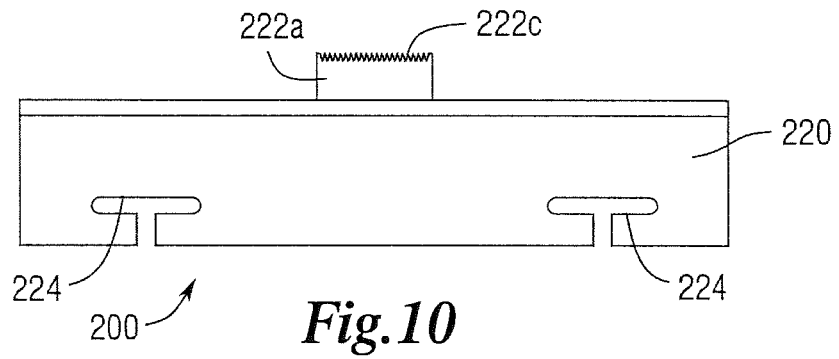
FIG. 10 is a top view of the stake pocket mounting bar of FIG. 6.
Figure 11:
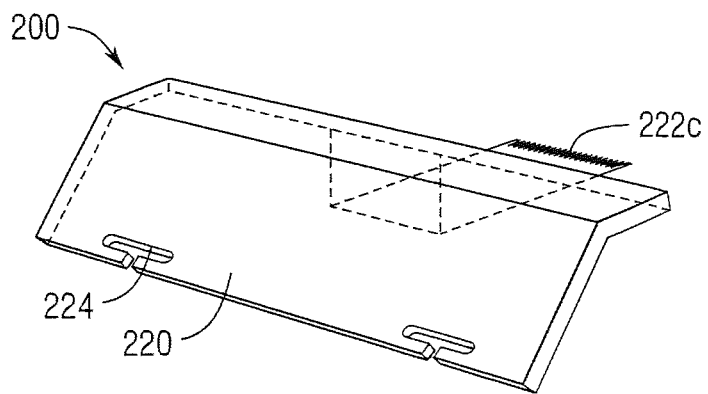
FIG. 11 is a bottom view of the stake pocket mounting bar of FIG. 6.

As shown most specifically in FIGS. 3 and 4, the portable step of the presently disclosed invention is adjustable and includes means for securely supporting rails 48 and 50 from an uneven surface. In the preferred embodiment, rails 48 and 50 cooperate with extension members 88 and 90 respectively. Extension members 88 and 90 are slidably connected to rails 48 and 50 respectively. More specifically, extension member 88 has a cross-section that corresponds to the shape of the cross-section of passageway 52 of rail 48 with extension member 88 being dimensioned such that it is internally received in the passageway 52 of rail 48 and is longitudinally slidable therein. Similarly, extension member 90 has a cross-section that corresponds to the shape of the cross-section of passageway 54 of rail 50 with extension member 90 being dimensioned such that it is internally received in the passageway 54 of rail 50 and is longitudinally slideable therein. In this way, extension members 88 and 90 slidably extend from rails 48 and 50 respectively in telescoping arrangement with extension member 88 having an end 89 that protrudes from rail 48 and extension member 90 having an end 91 that protrudes from rail 50.

In order to better support rails 48 and 50, extension members 88 and 90 are provided with feet 92 and 94 respectively. Foot 92 is connected to the end 89 of extension member 88 that protrudes from rail 48 and foot 94 is connected to the end 91 of extension member 90 that protrudes from rail 50. Feet 92 and 94 have respective contact surfaces 96 and 98 which, in the example of the preferred embodiment, define planar surfaces that are oriented in a generally orthogonal direction with respect to the longitudinal axes 100 and 102 of extension members 88 and 90. However, different orientations and contact surfaces with non-planar shapes are also within the scope of the presently disclosed invention.

To secure extension members 88 and 90 longitudinally with respect to rails 48 and 50, the presently disclosed adjustable step includes means for locking the extension members in a longitudinal position. In the preferred embodiment, first and second rails 48 and 50 have through holes 104 and 106 respectively. Correspondingly, extension members 88 and 90 have at least one and preferably a plurality of through holes 108 and 110 respectively. The through holes 108 of the extension member 88 are arranged in a linear array and are angularly located with respect to the axis 100 such that through holes 108 align with through hole 104 of rail 48 at times when extension members 88 are located at a given longitudinal position with respect to rail 48.

The through holes 110 of the extension member 90 are arranged in a linear array and are angularly located with respect to the axis 102 such that through holes 110 align with through hole 106 of rail 50 at times when extension member 90 is located at a given longitudinal position with respect to the rail 50. In this way, extension members 88 and 90 can be longitudinally adjusted in correspondence with the available support surface for feet 92 and 94 so that the step is afforded greater stability and support. When the extension member 88 is longitudinally located such that through holes 104 coincide with through holes 108, extension member 88 is longitudinally secured in rail 48 by inserting a pin 112 through holes 104 and 108. Similarly, when the extension member 90 is longitudinally located such that through holes 106 coincide with through holes 110, extension member 90 is longitudinally secured in rail 50 by inserting a pin 114 through holes 106 and 110.

In the example of the preferred embodiment that is disclosed in FIG. 4, pins 112 and 114 further include locking brackets 116 and 118 respectively. Locking brackets 116 and 118 are formed of wire or other flexible material. One end of locking bracket 116 is connected to the head 120 of pin 112. The opposite end of locking bracket 116 is formed in a loop such that it can be extended and placed over the tip 122 of pin 112. Similarly, one end of locking bracket 118 is connected to the head 124 of pin 114. The opposite end of locking bracket 118 is formed in a loop such that it can be extended and placed over the tip 126 of pin 114. In this way, locking brackets 116 and 118 secure pins 112 and 114 within the respective holes of extension members 88 and 90 and rails 48 and 50.

To provide greater selectivity in longitudinally positioning the extension member 88 and 90 with respect to the rails 48 and 50, through hole 104 and 106 in rails 48 and 50 respectively can be a multiple of holes in the form of a linear array of holes such as show in the embodiment of FIG. 4. This allows greater selectivity in the positioning of pin 112 in holes 104 and 108 and the positioning of pin 114 in holes 106 and 110.

FIGS. 6-11 show a preferred embodiment of a stake pocket mounting bar 200 according to the present invention having comprising anchor 220, preferably made of angle iron, having a toothed leg 222 which is preferably angled defining a 90° bend and removably insertable into a stake pocket 230 of a flatbed 228 of a truck (not shown). When inserted into the stake pocket 230, toothed portion 222a of toothed leg 222 will be disposed generally horizontally such that the teeth 222c dig into the side of the flatbed 228. Preferably, anchor 220 defines slots 224 for removably receiving looped ends of straps 227 used for removably attaching stake pocket mounting bar 200 to portable step 11, the brace 70 and/or rails, 48, 50 of which also preferably define such slots 224 for removably receiving the other ends of straps 227.

In use, stake pocket mounting bar 200 is attached to portable step 11 using straps 227 and slots 224 in anchor 220 and in the brace 70 and/or rails, 48, 50 of portable step 11. Toothed leg 222 of the stake pocket mounting bar 200 is then removably inserted into a stake pocket 230 of a flatbed 228 of a truck (not shown) so that toothed portion 222a of the toothed leg 222 is disposed generally horizontally such that the teeth 222c dig into the side of the flatbed 228 to secure portable step against the flatbed 228. In this manner, the stake pocket mounting bar 200 according to the present invention provides a means for securely and removably attaching portable step 200 to flatbed 228 to provide safe and effective access up and down from flatbed 228.

The invention claimed is:

1. A stake pocket mounting bar for removably attaching a step to a truck bed or other generally horizontal surface, comprising:
   an anchor member defining at least one open slot for removably receiving a looped end of a strap;
   a leg member having first and second ends wherein the first end is attached to the anchor member and the second end defines a plurality of teeth.

2. The stake pocket mounting bar of claim 1 wherein the anchor member defines two open slots, wherein each slot may removably receive a looped end of a strap.

3. The stake pocket mounting bar of claim 1 wherein the leg member defines about a 90° bend between its first and second ends.

4. The stake pocket mounting bar of claim 1 wherein the anchor comprises angle iron.

5. The stake pocket mounting bar of claim 1 wherein the leg member defines a bend between its first and second ends so that when the leg member is inserted into a stake pocket of the truck bed, the teeth will be disposed generally horizontally such that they may engage the side of the truck bed.

* * * * *